US006654892B1

(12) United States Patent
Karim

(10) Patent No.: US 6,654,892 B1
(45) Date of Patent: Nov. 25, 2003

(54) METHODS AND APPARATUS FOR PERMITTING TRANSACTIONS ACROSS FIREWALLS

(75) Inventor: Ron Karim, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/328,178

(22) Filed: Jun. 8, 1999

(51) Int. Cl.[7] ............... G06F 11/30; G06F 12/14; H04L 9/00; H04L 9/32
(52) U.S. Cl. ........................ 713/201; 713/229
(58) Field of Search ............... 713/201, 200; 709/229

(56) References Cited

U.S. PATENT DOCUMENTS

| | | | | |
|---|---|---|---|---|
| 5,649,099 A | * | 7/1997 | Theimer et al. | 713/201 |
| 5,841,978 A | * | 11/1998 | Rhoads | 709/217 |
| 5,987,611 A | * | 11/1999 | Freund | 713/201 |
| 6,092,114 A | * | 7/2000 | Shaffer et al. | 709/232 |

* cited by examiner

Primary Examiner—Gilberto Barron
Assistant Examiner—Benjamin E. Lanier
(74) Attorney, Agent, or Firm—Beyer Weaver & Thomas LLP

(57) ABSTRACT

Methods and apparatus for enabling document access across a firewall are disclosed. A method of accessing a document across a firewall includes obtaining a document access request on the first side of the firewall, where the document access request specifies a document control command and an associated file name. The document access request is then packaged in at least one client e-mail. The client e-mail is then sent across the firewall to the second side of the firewall. One or more acknowledgement e-mails are then received across the firewall from the second side of the firewall, where the acknowledgement e-mails specify a status of the executed document control command. In addition, a method of providing access to a document across a firewall includes receiving a client e-mail across the firewall from the first side of the firewall, where the client e-mail includes a document access request specifying a document control command and an associated file name. The document access request is then executed such that a status of the executed document access request is obtained. An acknowledgement e-mail specifying the status is then sent across the firewall to the first side of the firewall.

22 Claims, 13 Drawing Sheets

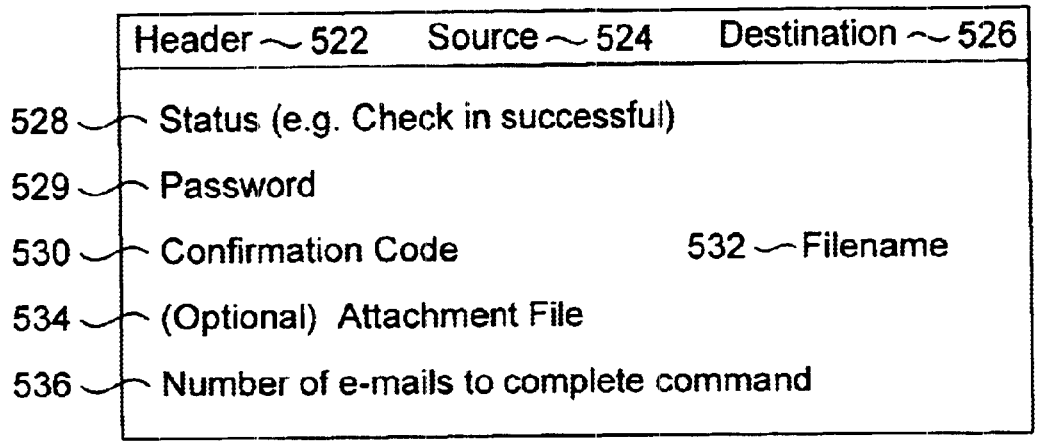
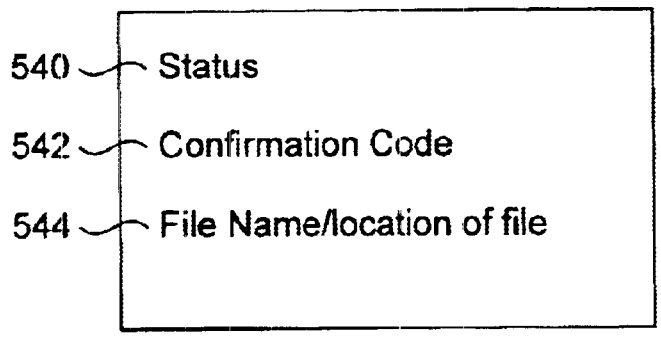
FIG. 5B

818

Command Data Structure

820 ⌒ Transaction ID

822 ⌒ Header : Source ⌒ Destination ⌒
                       824         826

828 ⌒ Command

830 ⌒ Filename

832 ⌒ Number of e-mails

834 ⌒ Execution ouput (e.g. status)

FIG. 8B

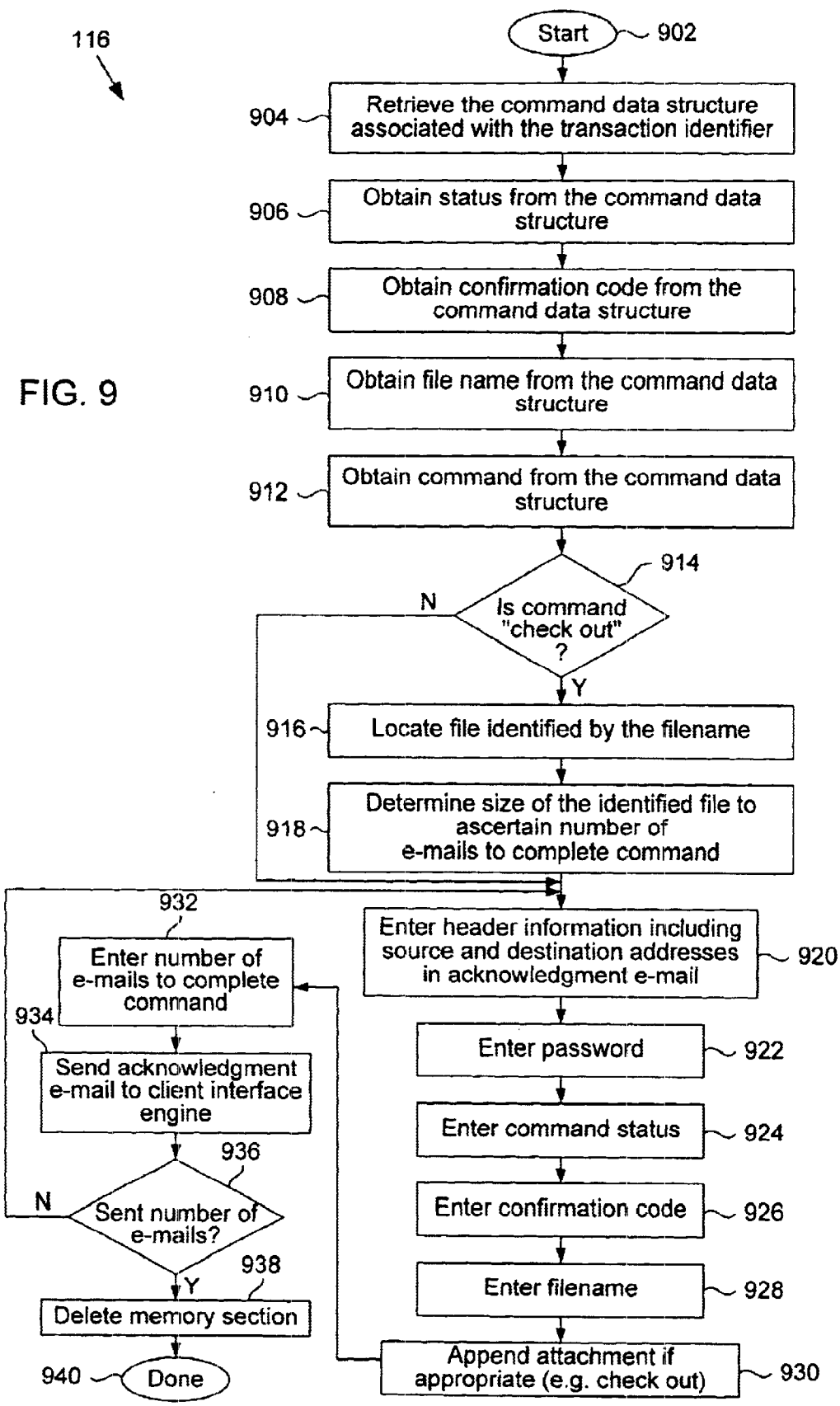

METHODS AND APPARATUS FOR PERMITTING TRANSACTIONS ACROSS FIREWALLS

BACKGROUND OF THE INVENTION

1. Field of the Invention

The present invention relates generally to computer software and computer network applications. More particularly, the present invention relates to methods and apparatus for permitting transactions across a firewall via Electronic Mail.

2. Discussion of Related Art

In today's technologically advanced society, companies and organizations often have a large number of computers as well as employees. Since multiple sites are often maintained, it is common for such entities to maintain the computer systems in locations that are situated a large distance apart from one another. Thus, it is often desirable to provide a means for communicating among the employees at these separate locations. In addition, resources such as programs and data are often shared among these employees. Accordingly, such entities often enable such communication and resource sharing through one or more networks.

In addition to providing communication among computers within a single entity (e.g., company), it is often desirable to enable communication with outside networks. By way of example, the Internet is a resource that is widely used by the general population. However, many entities store valuable and confidential information on internal networks. Accordingly, it is important that the security and integrity of this information be preserved while permitting access to and from outside networks.

While it is desirable to permit flow of information between internal networks and outside networks, it is important that access to confidential information be limited to intended individuals (e.g., individuals employed within the company). Similarly, it is imperative that the integrity of data and programs within an entity's system be protected from corruption. This is particularly important in view of the recent popularity of the Internet. Thus, many companies implement firewalls to filter traffic entering and leaving the network.

One standard firewall configuration includes two routers that filter packets and an application gateway. One router filters outgoing packets while another router filters incoming packets according to various filtering rules. Typically, tables store these filtering rules, which may list, for example, those sources and destinations that are acceptable. In addition, the application gateway operates at the application level. By way of example, an application gateway may be set up to examine the content of each incoming or outgoing e-mail message. In this manner, an added level of security may be added to any network.

While a firewall is desirable in many instances to provide a high level of security in a given network, such a security feature may create undesirable limitations. For instance, it is common for two or more companies to collaborate in their development efforts. In order to facilitate this joint development, it may desirable to permit employees of one company to access documents maintained by another company. However, it is typically impossible to share documents such as source code where a firewall separates the two networks.

In view of the above, it would be beneficial if a firewall could be selectively bypassed to permit source code or other files on one side of a firewall to be accessed by an entity on another side of the firewall.

SUMMARY

An invention is described herein that enables document access across a firewall. This is accomplished via a document access request sent via e-mail. In this manner, documents such as source code files may be sent and received across a firewall.

According to one aspect, a method of accessing a document across a firewall includes obtaining a document access request on the first side of the firewall, where the document access request specifies a document control command and an associated file name. The document access request is then packaged in at least one client e-mail. The client e-mail is then sent across the firewall to the second side of the firewall. One or more acknowledgement e-mails are then received across the firewall from the second side of the firewall, where the acknowledgement e-mails specify a status of the executed document control command.

According to another aspect, a method of providing access to a document across a firewall includes receiving a client e-mail across the firewall from the first side of the firewall, where the client e-mail includes a document access request specifying a document control command and an associated file name. The document access request is then executed such that a status of the executed document access request is obtained. An acknowledgement e-mail specifying the status is then sent across the firewall to the first side of the firewall.

BRIEF DESCRIPTION OF THE DRAWINGS

The invention, together with further advantages thereof, may best be understood by reference to the following description taken in conjunction with the accompanying drawings in which:

FIG. 5B is a block diagram illustrating exemplary formats for an acknowledgement e-mail communicating the status of the executed code access request and reply composed from the acknowledgement e-mail.

FIG. 8B is a block diagram illustrating an exemplary command data structure that may be used to store information associated with the code access request.

FIG. 9 is a flow diagram illustrating one method of implementing the acknowledgement server as shown at block 116.

DETAILED DESCRIPTION OF THE PREFERRED EMBODIMENTS

The present invention permits a user to access and modify information maintained on a network that is protected by a firewall. For instance, the present invention may be used to enable employees of one company to access documents maintained by another company. This is particularly useful where multiple companies are collaborating on a project where documents such as source code are being produced. It is important to note that such document access may be implemented even where a firewall separates the two networks. More particularly, the present invention enables a user to access a single set of information (e.g., source code) that is stored on a system protected by a firewall. This is accomplished via a document access request sent via e-mail, as will be described with reference to the following figures. In the following description, the portion requesting access to a document will be referred to as the client portion, while the portion executing the document access request will be referred to as the server portion. In addition, the server portion may provide a status or other information across the firewall to the client portion upon completion of execution. The present invention will described as accessing a source code file. However, the present invention may equally apply to documents (e.g., files) other than source code.

Figure 1:
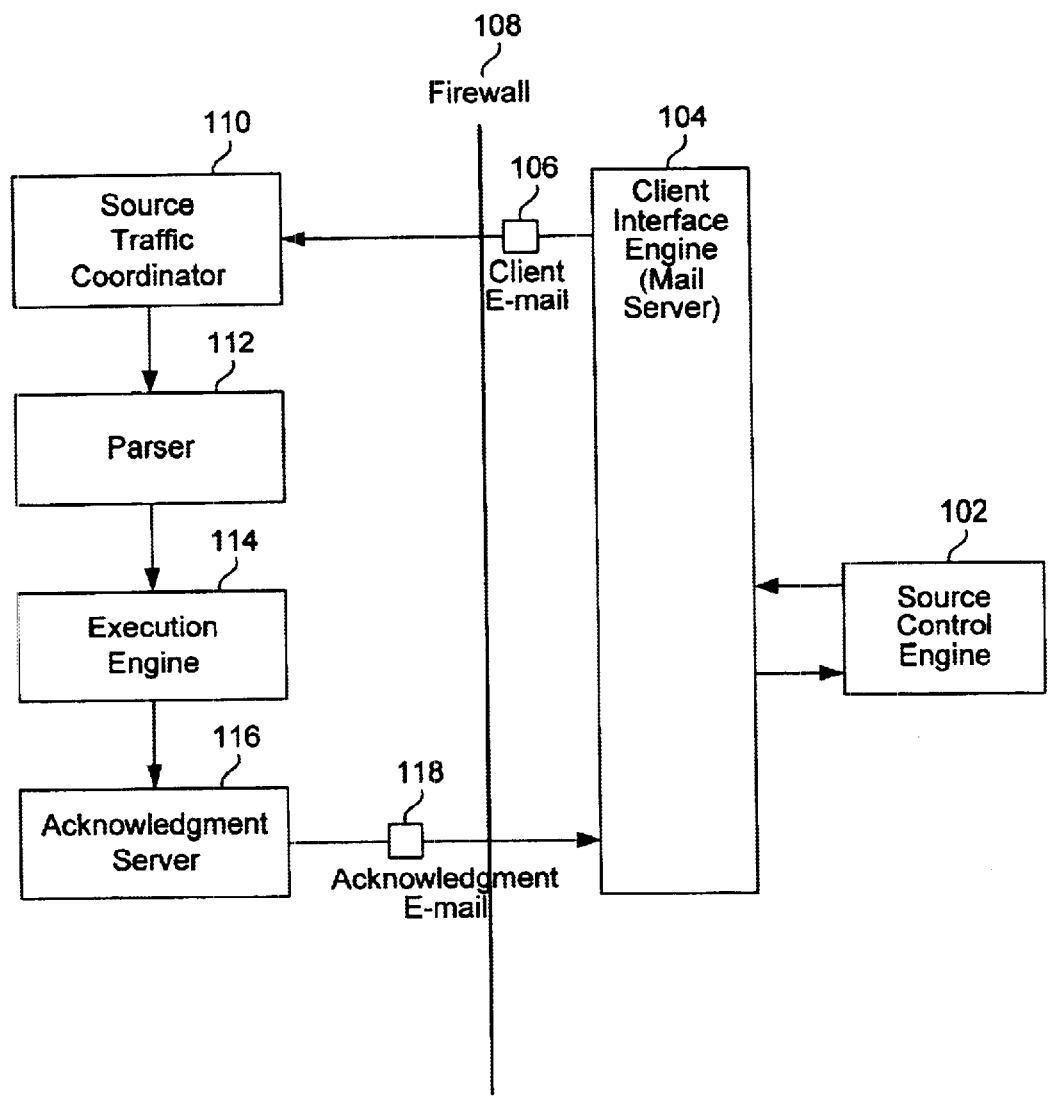
FIG. 1 is a block diagram illustrating a system in which the present invention may be implemented.

A block diagram illustrating a system in which the present invention may be implemented is presented in FIG. 1. In order to simplify the illustration, each block illustrates a separate process. When a client wishes to access or modify a set of source code, the client may send a "client code access request" via source control engine 102. More particularly, the client code access request may include a source code control command as well as an associated file name. By way of example, the source code control command may be a "check in," "check out," "view," or "copy" command. The source code control command will therefore allow a client to check in source code associated with the specified file name, check out the source code in the specified file name, view or copy the source code made available in the specified file.

Once a user has entered the client code access request via the source control engine 102 through a menu or other mechanism, the client code access request is sent to the client interface engine 104. The client interface engine 104 then packages the client code access request in one or more client e-mails 106 and sends these client e-mail messages across firewall 108 to source traffic coordinator 110.

Each client may send multiple code access requests. Moreover, client code access requests may be sent by multiple clients. Therefore, the source traffic coordinator 110 is responsible for routing the client code access requests as they are received to the appropriate process block on one or more servers. One method of implementing the source traffic coordinator 110 will be described in further detail with reference to FIG. 6B.

Figure 7:
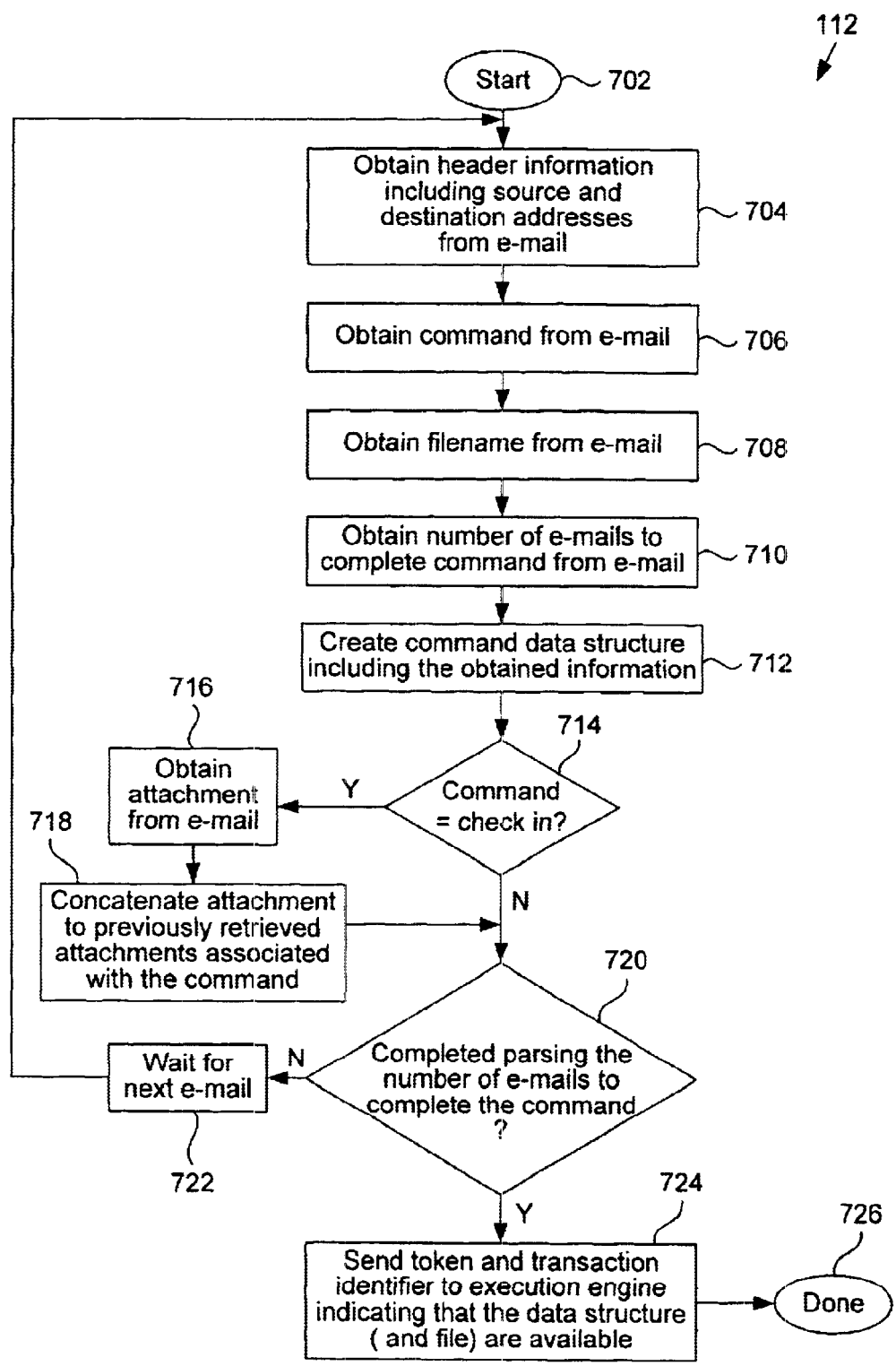
FIG. 7 is a flow diagram illustrating one method of parsing the client e-mail to obtain information associated with the code access request.

In order to execute each code access request, the code access request is parsed into the appropriate components (e.g., source code control command and file name). Thus, the source traffic coordinator 110 routes each client code access request to a parser 112 adapted for parsing a client code access request, as will be described in further detail with reference to FIG. 7. Once parsed, the components may be temporarily stored in a data structure for further processing.

Upon completion of the parsing, the parsed client code access request is forwarded to an execution engine 114 for execution. The execution engine 114 then executes the client code access request. By way of example, the execution engine may execute a code control command such as a "check in" command to check in an updated version of selected source code associated with the specified file name. One method of implementing the execution engine 114 will be described in further detail below with reference to FIG. 8A.

Once execution is completed, the execution engine 114 transfers control to an acknowledgement module or server 116 to obtain and transmit the status (e.g., success or failure) of the access request. More particularly, the acknowledgement server 116 composes an acknowledgement e-mail 118 indicating the status (e.g., success or failure) of the executed command. By way of example, the acknowledgement e-mail 118 may indicate that the source code has been successfully checked in. As yet another example, the acknowledgement e-mail 118 may include a portion of source code that has been successfully checked out. One method of implementing the acknowledgement server 116 will be described in further detail below with reference to FIG. 9. The acknowledgement server 116 then sends the acknowledgement e-mail 118 to the client interface engine 104, which may compose a reply suitable for the originator of the access request. Once the client interface engine 104 has composed the reply, the reply is forwarded to the source control engine 102 to be routed to the originator of the access request. In this manner, a user may access and update a single set of source code across a firewall 102 via e-mail. Although the operations on each side of the firewall are shown as separate blocks, these operations may be performed on one or more servers. Accordingly, the present invention may be advantageously used to implement an effective source code control system that may be accessed by multiple companies.

Figure 2:
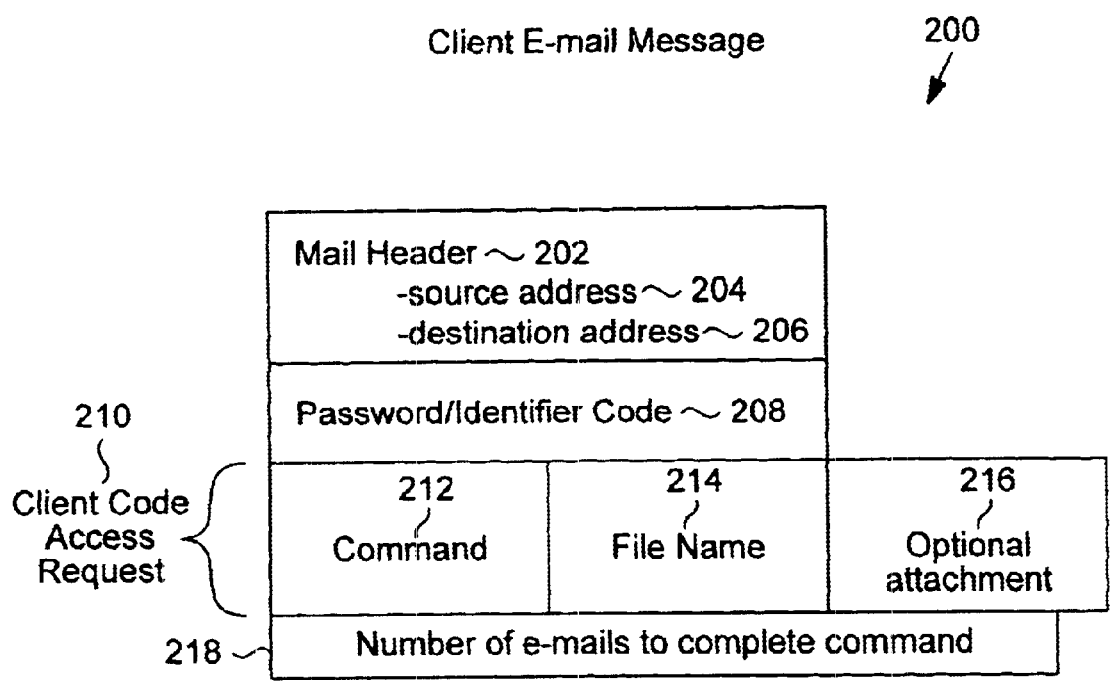
FIG. 2 is a block diagram illustrating an exemplary e-mail message that may be sent across a firewall to request access to a document according to an embodiment of the invention.

As described above, each code access request specifying a code control command and associated file name is packaged in one or more client e-mails. FIG. 2 is a block diagram illustrating an exemplary client e-mail message that may be sent across a firewall to request access to a document (e.g., source code) according to an embodiment of the invention. As shown, the client e-mail message 200 includes a mail header 202 including a source address 204 and a destination address 206. Moreover, the present invention preferably handles only those e-mails that are addressed to the source code control system of the present invention. It is therefore desirable to implement a password or identifier code 208 that may be used to designate those e-mails that are addressed to the source code control system. In this manner, e-mails erroneously received by the source code control system may be discarded. As described above, a client code access request 210 includes a source code control command 212 and a file name associated with the source code control command 212. The file name 214 therefore permits the source code control system to access the specified file 214.

In addition, if the command 212 is a check in command, the source code being checked in may be appended as attachment 216.

It may be necessary to send the client code access request in multiple e-mails. By way of example, when a file being checked into the source code control system is large, it may be fragmented into smaller portions, which may then be sent in separate client e-mails. Accordingly, the number of client e-mail packets 218 to be sent in order to complete the client code access request may be specified in each client e-mail message 200. In this manner, the source traffic coordinator may easily determine which client e-mails correspond to a single code access request.

As shown and described above with reference to FIG. 1, the source code control system is implemented on both sides of the firewall. Thus, on the client side of the firewall, the client (i.e., client portion) must be capable of sending a client code access request including a source code control command as well as receiving the status of the request across the firewall. In addition, the source code control system executes the source code control commands and provides an acknowledgement of the status of these commands on the opposite side of the firewall (i.e., server portion).

Figure 3:
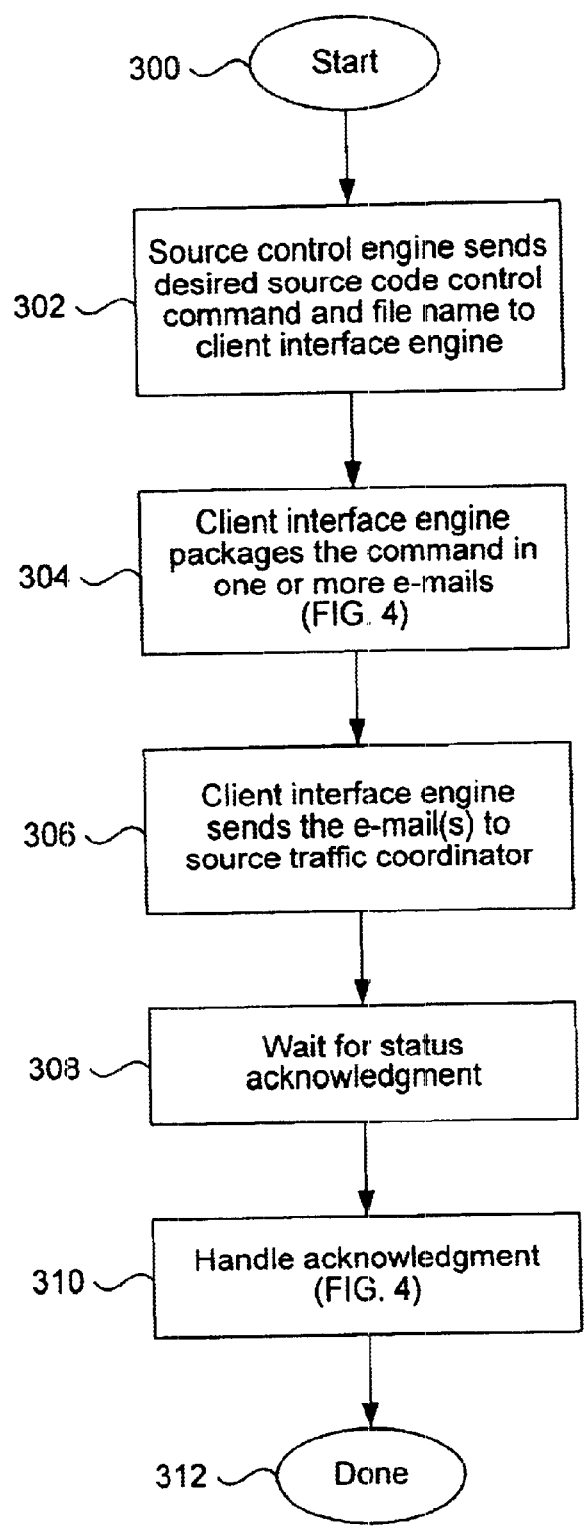
FIG. 3 is a flow diagram illustrating a method of implementing the source code control system on the client side of a firewall according to an embodiment of the invention.

One method of implementing the client portion of the source code control system shown in FIG. 1 is illustrated in FIG. 3. The process begins at block 300 and at block 302, the source control engine obtains and sends the desired source code control command and associated file name to the client interface engine. More particularly, the source code control command and associated file name may be obtained via a menu, file, or other mechanism. The client interface engine then packages the source code control command and associated file name in one or more client e-mails at block 304, as will be described in further detail below with reference to FIG. 4. The client interface engine then sends the client e-mail(s) to the source traffic coordinator at block 306. The client then waits for a status acknowledgement regarding the status of execution of the source code control command at block 308. Once the acknowledgement is received, the status acknowledgement is handled at block 310, as will be described in further detail below with reference to FIG. 5A. More particularly, the status acknowledgement may be handled such that notification of the status is sent to the originator of the document access request. In this manner, the originator may be notified of any errors that occurred during execution of the document access request. The process ends at block 312. Although the previously described process refers to one document access request, each client may send multiple document access requests.

Figure 4:
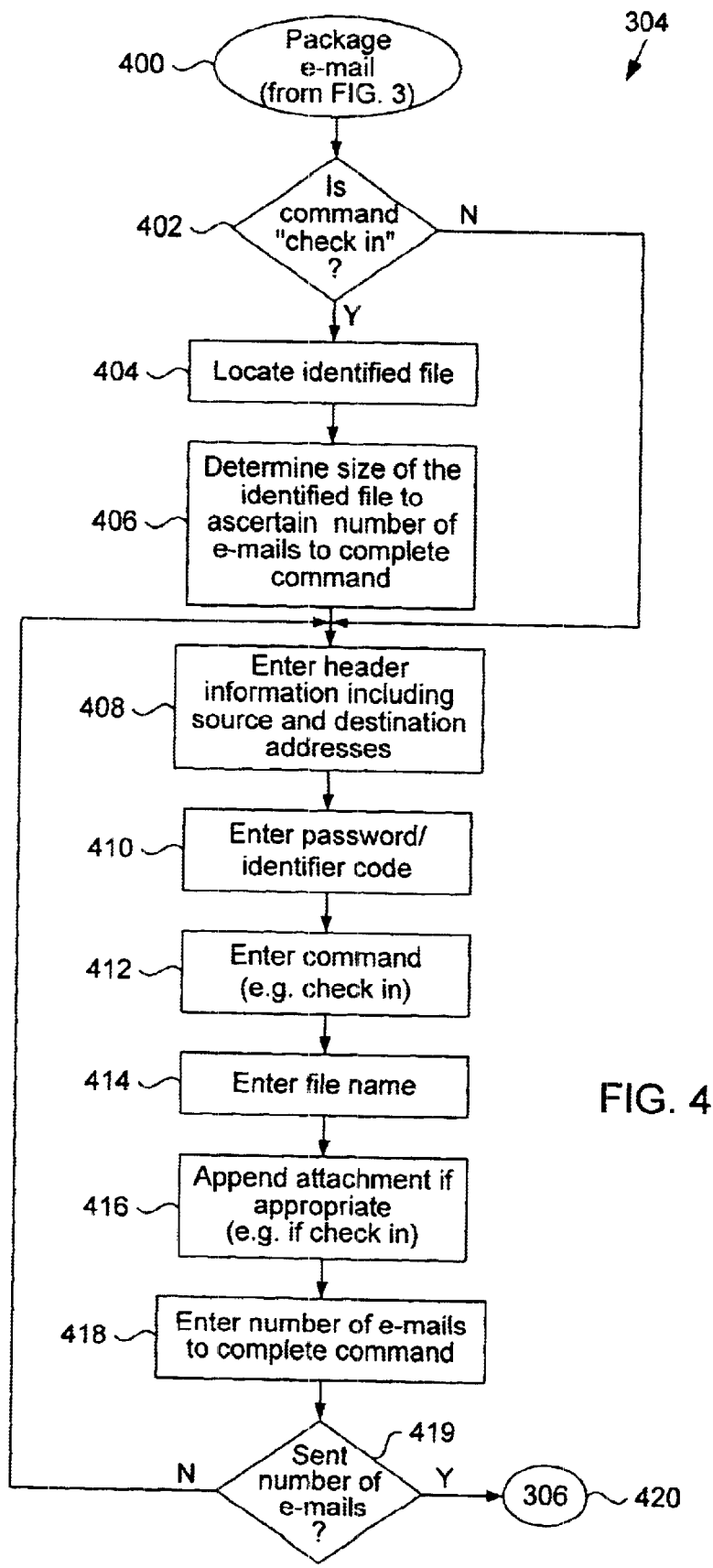
FIG. 4 is a flow diagram illustrating a method of packaging a client code access request in one or more client e-mail messages as shown at block 304 of FIG. 3.

As described above with reference to FIG. 3, each code access request is packaged in one or more client e-mails to be transmitted across the firewall to be processed by the server portion of the source code control system. FIG. 4 is a flow diagram illustrating a method of packaging a client code access request in one or more client e-mail messages as shown at block 304 of FIG. 3. As will be described, the process fills the fields of one or more client e-mail messages such as that illustrated in FIG. 2, and sends the client e-mail messages across the firewall for execution of the corresponding access request. The process begins at block 400 and at block 402, it is determined whether the source code control command is a "check in" command indicating that source code in the associated identified file is being checked into the source code control system. If the command is a check in command, the associated file is identified at block 404 and the size of the file is determined at block 406. The size of the file may then be used to ascertain the number of e-mails that are to be sent in order to complete the command. If the command is not a check in command, steps 404 and 406 are bypassed and the process continues to package the e-mail in blocks 408 through 420. As shown, the mail header information such as source and destination addresses is entered in the client e-mail packet at block 408. Next, at block 410, a password/identifier code is entered to indicate that the e-mail is addressed to the source code control system. The source code control command (e.g., check in command) is entered at block 412 and the associated file name is similarly entered at block 414. In addition, if the command is a check in command, the source code is appended to the e-mail as an attachment at block 416. In addition, the number of e-mails required to complete the command is entered in the client e-mail at block 418. In this manner, the fields of a client e-mail may be filled in order to transmit an access request across the firewall. If it is determined at block 419 that each of the number of e-mails associated with the corresponding access request has been composed and sent, the process ends at block 420. Alternatively, the process continues at block 408 to package the remaining client e-mail messages associated with the access request. In this manner, one or more client e-mail messages such as that shown in FIG. 2 may be packaged by the client to execute a single source code control command.

Figure 5A:
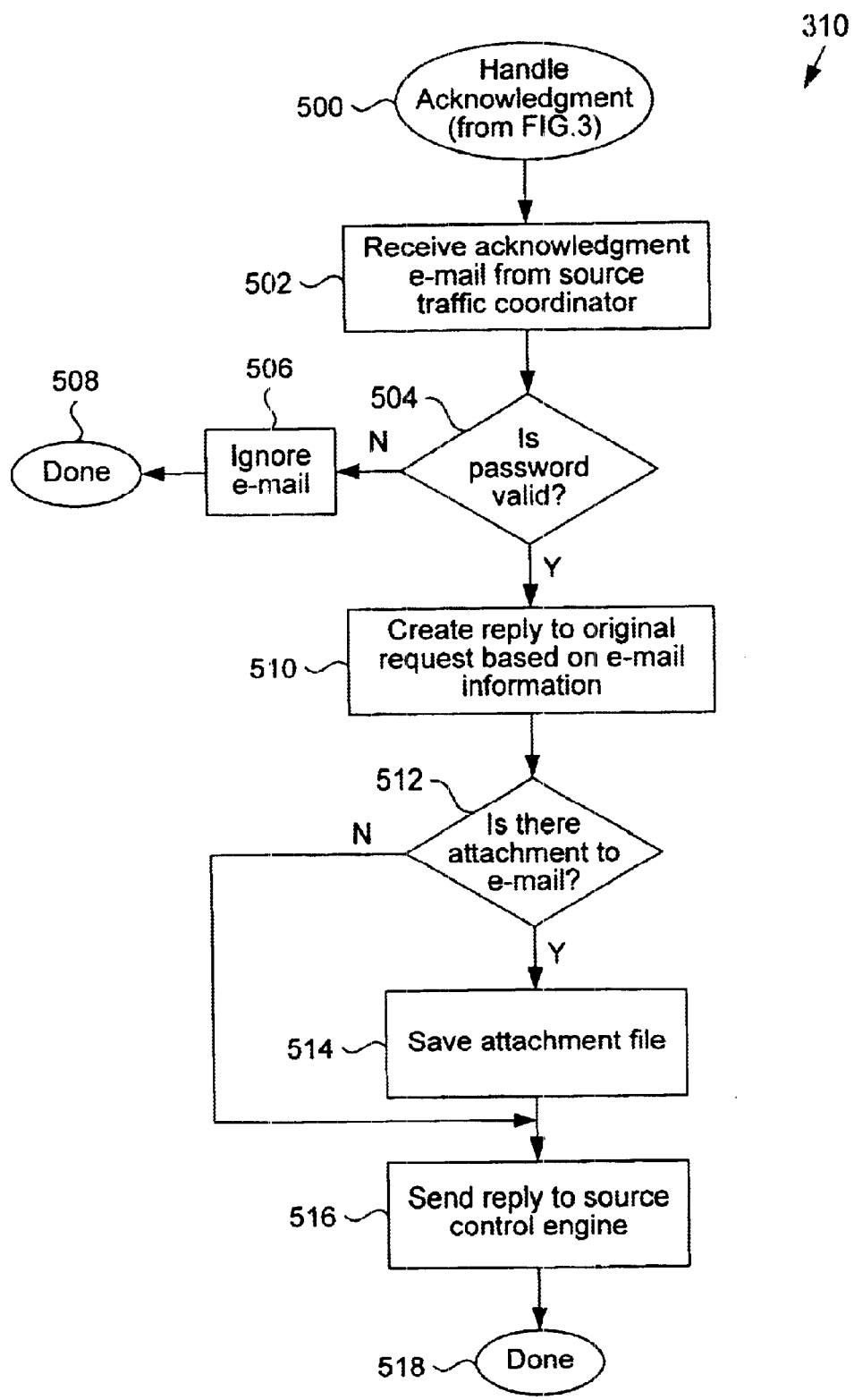
FIG. 5A is a flow diagram illustrating a method of handling an acknowledgement of the status of the executed code access request as shown at block 310 of FIG. 3.

Once a source code control command provided in a client e-mail message is executed, acknowledgement of such execution is sent back to the client as the source of the client e-mail message. FIG. 5A is a flow diagram illustrating a method of handling an acknowledgement of the status of the executed code access request as shown at block 310 of FIG. 3. The process begins at block 500 and at block 502, an acknowledgement e-mail is received by the client interface engine from an acknowledgement server. As described above, a password may be used to indicate those e-mails that are to be processed by the source code control system. Thus, the password provided by the client in the client e-mail message may similarly be provided in the return acknowledgement e-mail to indicate that the e-mail has been processed by the source code control system. If it is determined at block 504 that the password is invalid, the e-mail is ignored at block 506 and the process completes at block 508. However, if the password is valid, a reply to the original client source code access request is created based upon the information in the acknowledgement e-mail at block 510. In this manner, selected information provided in the acknowledgement e-mail may be used to compose a reply suitable for the originator of the source code access request.

As described above, an attachment to the client e-mail message may be supplied when code is being checked into the source code control system. Similarly, an attachment to the acknowledgement e-mail message may be provided when code is being checked out of the source code control system. Thus, it is determined at block 512 whether there is an attachment to the acknowledgement e-mail. If there is an attachment, the attachment may be saved at block 514 for retrieval by the originator of the access request. The reply is then sent by the client interface engine to the source control engine at block 516 for distribution to the client that originated the access request. The process ends at block 518. Accordingly, a client may receive source code being checked out of the source code control system as well as a status indicating the success or failure of the access request previously sent by the client.

As described above with reference to FIG. 5A, upon completion of execution of each command, an acknowledgement e-mail is composed so that the status of the access request may be supplied to the client. In addition, a reply may be composed from selected information (e.g., status) provided in the acknowledgement e-mail. FIG. 5B is a block diagram illustrating exemplary formats for an acknowledgement e-mail communicating the status of the executed code access request and reply composed from the acknowledgement e-mail. As shown, an acknowledgement e-mail 520 includes a header 522 specifying source 524 and destination 526 addresses. In addition, a status 528 associated with the client code control command is provided. By way of example, the status 528 may indicate that the check in of the file was successful where the client code control command is a check in command. The password 529 that indicates that the e-mail has been processed by the source code control system may also be provided. In addition, a log file may be maintained indicating that the command has been executed and any information pertaining to this execution. Thus, a confirmation code 530 associated with this log entry may be provided to the client to permit the client to verify that the command has been successfully executed. In addition, the file name 532 associated with the executed command may be provided. As described above, where the client code control command is a check out command, the content of the file (e.g., source code) being checked out of the source code control system may be provided as an attachment file 534 to the acknowledgement e-mail. In addition, the number of e-mails to complete the command is specified at 536. By way of example, multiple acknowledgement e-mails may be provided where a file being checked out of the source code control system is large.

Although one or more acknowledgement e-mails indicating the status of the executed command has previously been composed, the content and format of the acknowledgement e-mail may not be suitable for the client issuing the command. In addition, as indicated above, for each executed command, there may be multiple acknowledgement e-mails. For instance, as described above, where the command is a check out command, each acknowledgement e-mail may contain a portion of a checked out file as an attachment to the acknowledgement e-mail. Therefore, there may be multiple acknowledgement e-mails associated with an executed command. As a result, it may be desirable to compose a single reply suitable for transmission to the client as source of the command. Thus, a reply 538 is composed from one or more associated acknowledgement e-mails 520. More particularly, the reply 538 may include a status 540 and confirmation code 542 such as those provided in the acknowledgement e-mail. In addition, a file name 544 that identifies the executed source code control command may be supplied. By way of example, where a client receives a "check in successful" reply, it is desirable to identify the file that has been checked in. As yet another example, where a client receives a "check out successful" reply, it is desirable to identify the file name or location of the file that was received in the attachment to the acknowledgement e-mail (s). Accordingly, the client may later obtain the file that has been retrieved from the system, update the file, and check the updated file back into the source code control system.

As described above, the client is capable of transmitting client code access requests and receiving acknowledgement of the status these requests. Similarly, on the opposite side of the firewall, the source code control system executes the client code access requests and provides acknowledgement of this execution. The operations performed to successfully execute each client code access request and provide acknowledgement upon completion of execution are described with reference to FIGS. 6A through 9.

Figure 6A:
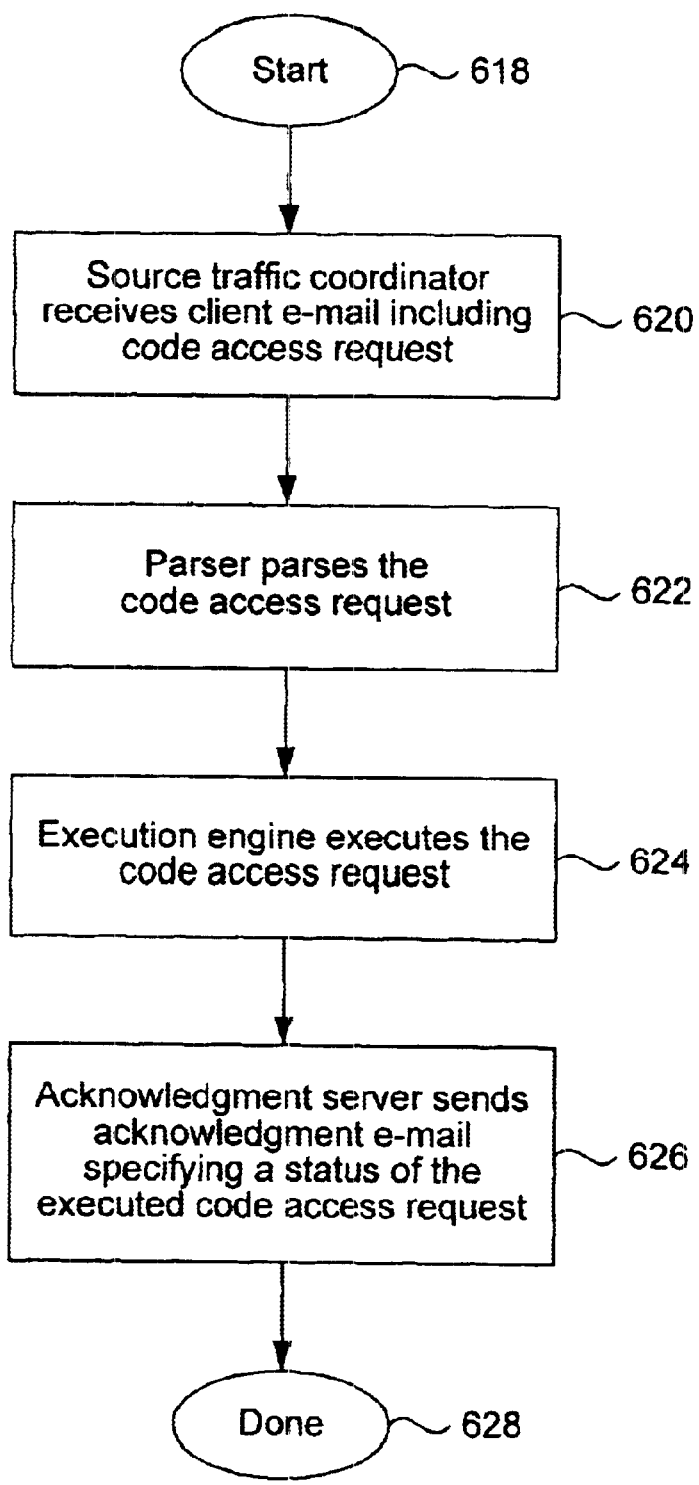
FIG. 6A is a flow diagram illustrating one method of providing access to source code across a firewall (i.e., on the server side of the firewall) according to an embodiment of the invention.

As shown and described with reference to FIG. 1, once a document access request is sent across a firewall, the document access request is executed on the server side of the firewall. FIG. 6A is a flow diagram illustrating one method of providing access to source code across a firewall (i.e., on the server side of the firewall) according to an embodiment of the invention. The process begins at block 618 and at block 620, the source traffic coordinator receives a client e-mail including a code access request across the firewall. The client e-mail is then routed to the parser, which parses the code access request at block 622 such that the code access request may be executed. The execution engine executes the parsed code access request at block 624. Upon completion of execution, a status indicating success or failure of the executed code access request may be obtained by the execution engine. The status is then forwarded to the acknowledgement server. At block 626, the acknowledgement server then composes and sends an acknowledgement e-mail specifying the status of the executed code access request, as well as other information identifying the code access request. The process ends at block 628. In this manner, a client e-mail is routed by the source traffic coordinator to the parser and executed. In response, one or more acknowledgement e-mails are composed and sent to communicate the status of the corresponding access request.

Figure 6B:
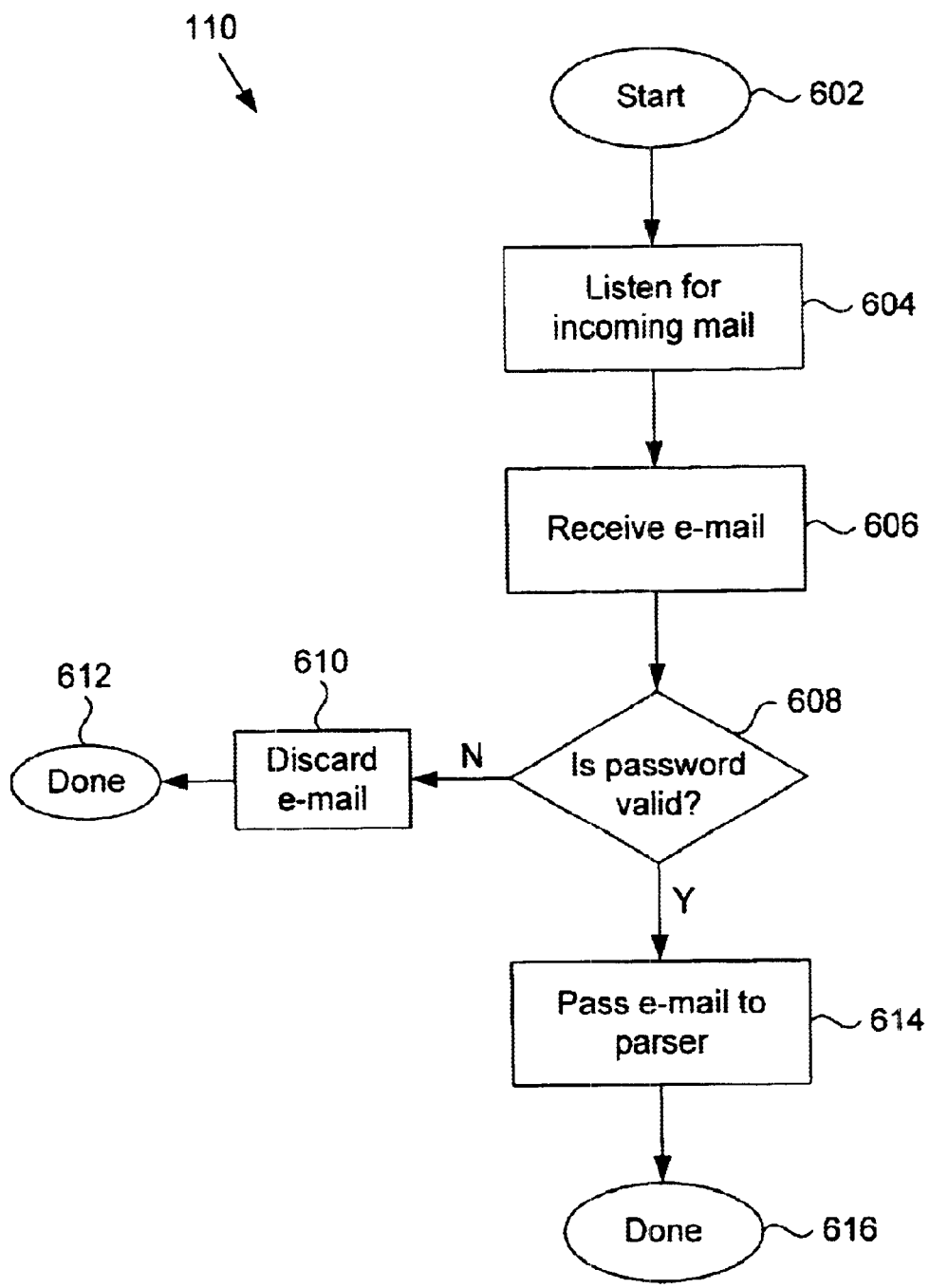
FIG. 6B is a flow diagram illustrating one method of implementing the source traffic coordinator shown at block 110 of FIG. 1.

Multiple clients may wish to access the source code control system. Moreover, each client may issue more than one access request. As a result, it is desirable to provide a source traffic coordinator for routing each access request as it is received by the system. As shown in FIG. 6B, one method of implementing the source traffic coordinator shown at block 110 of FIG. 1 is presented. The process begins at block 602 and at block 604, the source traffic coordinator listens for incoming mail at block 604. When an e-mail is received at block 606, it is preferable to discard those e-mails that are not addressed to the source code control system. Thus, at block 608, it is determined whether the password/code identifier is valid. If the password is not valid, the e-mail may be ignored or discarded at block 610 and the process completes at block 612. If the password is valid, the e-mail is then passed to the parser at block 614. The process ends at block 616. In this manner, the source traffic coordinator may route client e-mails as they are received across the firewall.

In order to execute the source code access request transmitted in the client e-mail, information such as the code control command and associated file name are obtained from the client e-mail. This is accomplished through the use of a parser. Thus, once the client e-mail is received by the parser, the parser parses the e-mail to obtain information associated with the source code access request. One method of parsing the client e-mail to obtain information associated with the code access request as shown at block 112 of FIG. 1 is presented in FIG. 7. As shown, the parser begins at block 702 and at block 704, the header information, including source and destination addresses, are obtained from the e-mail. Next, the command is obtained from the client e-mail at block 706 and the associated file name is obtained at block 708. In addition, the number of client e-mails that are to be received in order to complete the command is obtained at block 710.

Once the client e-mail has been parsed, the information may be stored in a command data structure. The command data structure may therefore be created at block 712 to temporarily store this obtained information. Moreover, since multiple users may each send more than one e-mail, a transaction identifier may be associated with the command data structure for each client e-mail being handled by the source code control system.

In addition to parsing the information in the client e-mail, the client e-mail may include an attachment containing source code that is being checked in to the system. Thus, it is determined at block 714 whether the command is a check in command. If the command is a check in command, the attachments are concatenated for all e-mails sent to complete the command. In other words, the attachment for each one of the number of client e-mails obtained at block 710 are concatenated. Thus, the attachment is obtained at block 716 and the attachment is concatenated at block 718 to previously retrieved attachments associated with the command. In this manner, source code or other documents being checked in to the system may be constructed from multiple attachments.

If it is determined at block 720 that the parser has not completed parsing the number of client e-mails sent to complete the command, the next e-mail is obtained at block 722 and the process continues at block 704. In this manner, information in each client e-mail may be retrieved. Therefore, if the newly received client e-mail is associated with the previous access request, concatenation of the attachment is performed as described above. However, if all e-mails associated with the command have been parsed, the parser indicates that parsing has been completed at block 724. More particularly, the parser may send a token to the execution engine indicating that parsing is completed as well as a transaction identifier associated with the transaction. The execution engine may therefore identify the command data structure and retrieve any associated files through the use of the transaction identifier. The process ends at block 726.

Figure 8A:
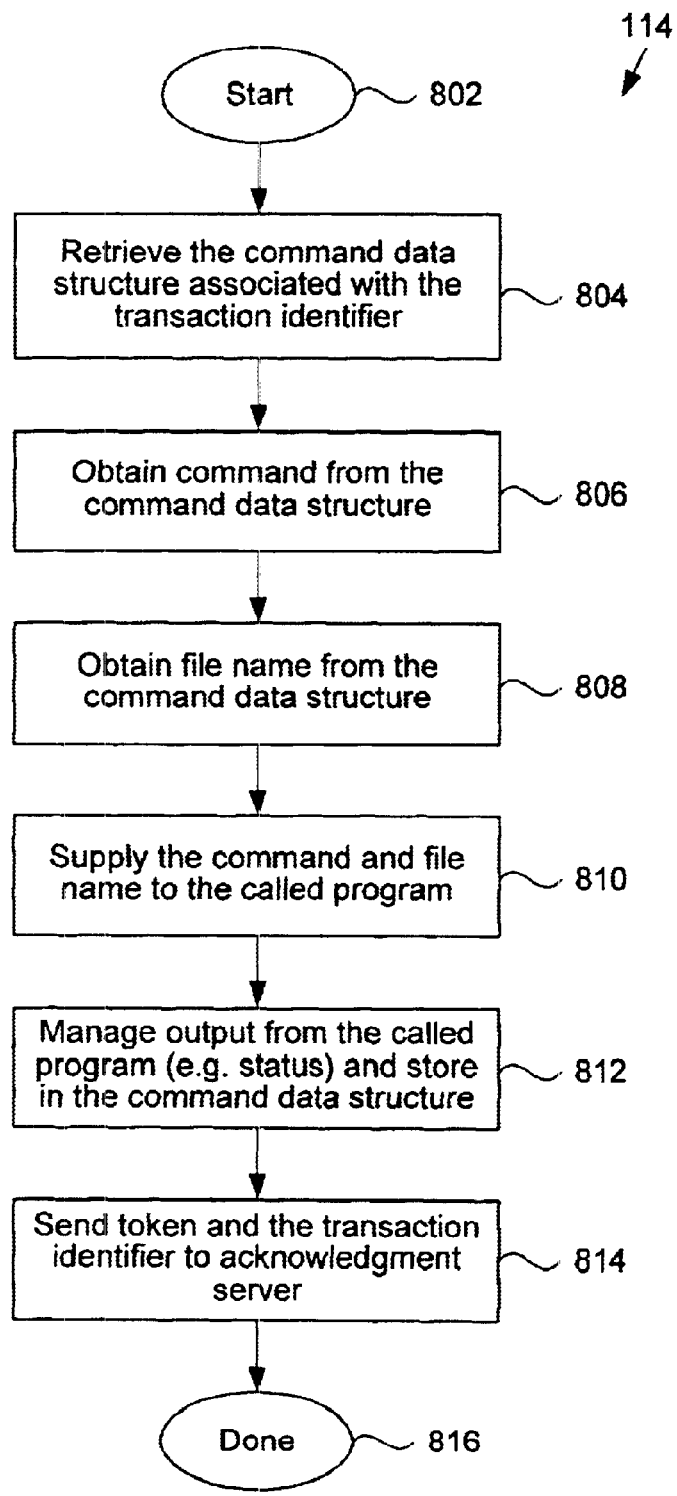
FIG. 8A is a flow diagram illustrating one method of implementing the execution engine shown at block 114 of FIG. 1.

Once the transaction identifier is received by the execution engine, the execution engine may identify the information associated with the command to be executed. The information may therefore be obtained in order to execute the command. One method of implementing the execution engine as shown at block 114 of FIG. 1 is illustrated in FIG. 8A. The process begins at block 802 and at block 804, the command data structure associated with the transaction identifier is retrieved. The command is then obtained from the command data structure at block 806. Similarly, the file name associated with the command is obtained from the command data structure at block 808. The command and the file name are then supplied as parameters to a program capable of executing the source code control commands (e.g., check in, check out) at block 810. By way of example, a Source Code Control System (SCCS), provided as a standard utility with Solaris Operating systems, is available from Sun Microsystems, Inc., located in Palo Alto, Calif. The output is then obtained from the called program and managed at block 812. By way of example, the output may include the status (e.g., fail or pass) of the command execution which may then be stored in the command data structure. A token indicating that the command has been executed and the transaction identifier may then be sent to the acknowledgement server at block 814. The process ends at block 816.

As described above with reference to FIGS. 7 and 8A, information associated with a code access request may be stored temporarily until the request is completed and the status is communicated to the client transmitting the code access request. Referring now to FIG. 8B, a block diagram illustrating an exemplary command data structure that may be used to store information associated with the code access request. As shown, a command data structure 818 may include a transaction identifier 820, header information 822 such as source 824 and destination 826 addresses. In addition, the command data structure 818 may further include the command to be executed 828, the file name 830 associated with the command, and the number of e-mails 832 required to complete execution of the command. Once execution of the command is complete, output 834 obtained from the called program such as a status (e.g., pass or fail) may be stored in the command data structure. Each command data structure may be made available to the source traffic coordinator, the parser, the execution engine, and the acknowledgement server in a common memory location. In addition, any files identified by the file name 830 may be temporarily stored in a common memory location. Once execution and acknowledgement of each command is performed, this memory may be re-allocated as necessary.

When the acknowledgement server receives notification that the command has executed, it then composes an appropriate acknowledgement e-mail from the information in the command data structure. One method of implementing the acknowledgement server as shown at block 116 is presented in FIG. 9. The process begins at block 902 and at block 904, the command data structure associated with the transaction identifier is retrieved. The status (e.g., pass or fail) is then obtained from the command data structure at block 906. In addition, the confirmation code is obtained from the command data structure at block 908. Next, at block 910, the file name is obtained from the command data structure. In addition, the executed command (e.g., check in) may be obtained from the command data structure at block 912.

Once all information that is to be provided in an acknowledgement e-mail is obtained from the command data structure, any associated file is then retrieved. By way of example, when a file is checked out of the system, it is sent in one or more attachments to the client via the client interface engine. Thus, if it is determined at block 914 that the command is a check out command, the file identified by the obtained file name is located at block 916. The size of the identified file is then determined at block 918 to ascertain the number of acknowledgement e-mails that are to be sent in order to complete the command.

For each of the number of acknowledgement e-mails to be sent, blocks 920 through 934 are performed. Thus, at block 920, header information including source and destination addresses are provided in the acknowledgement e-mail. The destination address may be obtained from the source address provided in the command data structure or from a username database. In addition, the password is entered at block 922, where the password indicates that the acknowledgement e-mail has been handled by the source code control system. A command status 924 indicating the command (e.g., check in) and execution status (e.g., successful) are entered at block 924. In addition, at block 926, the confirmation code is entered to permit a user to verify that a command has executed successfully. In addition, the file name 928 may be provided to permit a user to identify which file has, for example, been checked in or out of the source code control system. An attachment is appended to the acknowledgement e-mail if appropriate at block 930. By way of example, if the command is a check out command, an attachment containing at least a portion of the file is appended as an attachment. The number of acknowledgement e-mails that are to be sent in order to transmit all information associated with the executed command is then entered at block 932. The acknowledgement e-mail is then sent to the client interface engine at block 934. If it is determined at block 936 that each of the number of acknowledgement e-mails associated with the executed command have been sent, all temporary memory such as that used to store the command data structure(s) as well as files that have been checked out may be deleted at block 938. If it is determined at block 936 that one or more acknowledgement e-mails associated with the executed command remain to be sent, the remaining acknowledgement e-mails are composed and sent at block 920. The process ends at block 940.

As previously described, the present invention enables information that is stored on a network to be retrieved and modified, even where the network is protected by a firewall. The present invention therefore provides numerous advantages since entities may share a single set of documents without modifying or eliminating the firewall separating the entities. Accordingly, through the application of the present invention, a balance may be achieved between security and the level of information sharing that is crucial to technological advancement.

Figure 10:
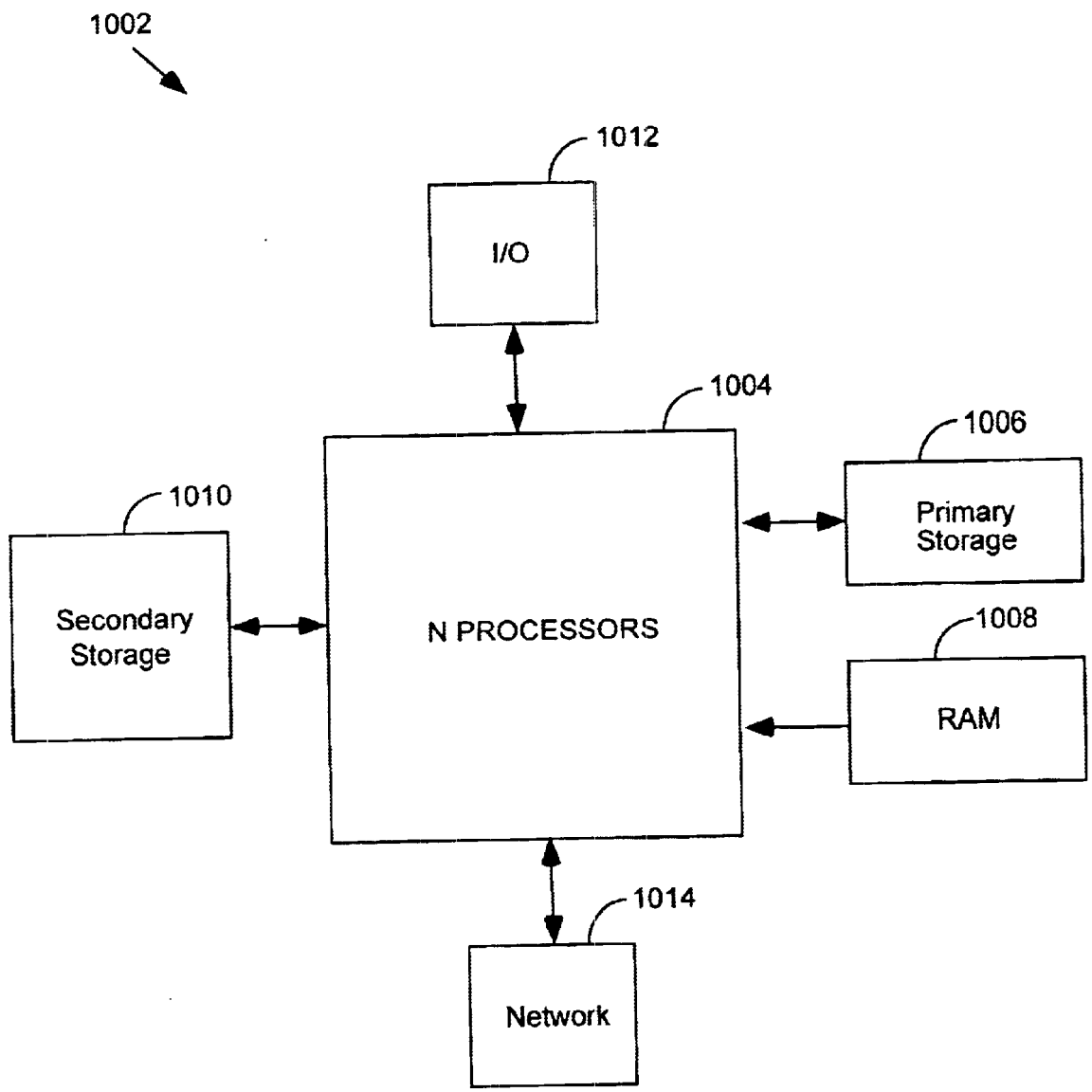
FIG. 10 is a block diagram illustrating a typical, general-purpose computer system suitable for implementing the present invention.

The source code control system of the present invention may be implemented in a variety of ways. By way of example, the present invention may be implemented in an object-oriented language. Moreover, the present invention may generally be implemented on any suitable computer system. FIG. 10 illustrates a typical, general-purpose computer system 1002 suitable for implementing the present invention. The computer system 1002 includes any number of processors 1004 (also referred to as central processing units, or CPUs) that may be coupled to memory devices including primary storage device 1006 (typically a read only memory, or ROM) and primary storage device 1008 (typically a random access memory, or RAM). As is well known in the art, ROM acts to transfer data and instructions uni-directionally to the CPUs 1004, while RAM is used typically to transfer data and instructions in a bi-directional manner. Both the primary storage devices 1006, 1008 may include any suitable computer-readable media. The CPUs 1004 may generally include any number of processors.

A secondary storage medium 1010, which is typically a mass memory device, may also be coupled bi-directionally to CPUs 1004 and provides additional data storage capacity. The mass memory device 1010 is a computer-readable medium that may be used to store programs including computer code, data, and the like. Typically, the mass memory device 1010 is a storage medium such as a hard disk which is generally slower than primary storage devices 1006, 1008.

The CPUs 1004 may also be coupled to one or more input/output devices 1012 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1004 optionally may be coupled to a computer or telecommunications network, e.g., an internet network or an intranet network, using a network connection as shown generally at 1014. With such a network connection, it is contemplated that the CPUs 1004 might receive information from the network, or might output information to the network in the course of performing the below-described method steps. Such information, which is often represented as a sequence of instructions to be executed using the CPUs 1004, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, a and these variations would become clear to those of ordinary skill in the art after perusal of this application. For instance, the present invention is described as enabling access to source code across a firewall. Although the above description refers to "source code," the present invention may be used to access or modify any document or file across a firewall. Moreover, the above described process blocks are illustrative only. Therefore, accessing a file across a firewall may be accomplished via e-mail using alternate process blocks. Accordingly, the present embodiments are to be considered as illustrative and not restrictive, and the invention is not to be limited to the details given herein, but may be modified within the scope and equivalents of the appended claims.

What is claimed is:

1. A method of providing access to a document across a firewall having a first side and a second side, the method comprising:

receiving a client e-mail across the firewall from the first side of the firewall, the client e-mail including a document access request specifying a document control command and an associated file name;

executing the document access request such that a status of the executed document access request is obtained;

sending an acknowledgement e-mail specifying the status across the firewall to the first side of the firewall;

parsing the client e-mail to obtain information associated with the document access request;

determining whether the client e-mail includes an attachment; and wherein when it is determined that the client e-mail includes an attachment, concatenating the attachment to previously retrieved attachments associated with the document access request.

2. The method as recited in claim 1, wherein the status indicates success or failure of the document access request.

3. The method as recited in claim 1, wherein the document control command specifies at least one of check in, check out, view, or copy.

4. The method as recited in claim 1, wherein the file name identifies a source code file.

5. The method as recited in claim 1, wherein the acknowledgement e-mail provides notification of the status of the executed document control command to an originator of the document access request on the first side of the firewall.

6. The method as recited in claim 1, wherein a number of client e-mails are received in order to complete the document control command for the file.

7. The method as recited in claim 6, wherein the client e-mail includes the number of e-mails to complete the document control command.

8. The method as recited in claim 1, wherein the client e-mail further includes header information including source and destination addresses;

and a password indicating that the client e-mail is to be handled by a document control system.

9. The method as recited in claim 8, wherein the client e-mail specifies a total number of client e-mails to be sent in order to complete the document access request.

10. The method as recited in claim 1, wherein the acknowledgement e-mail includes an attachment;

wherein the document control command is a check out command; and wherein the attachment of the acknowledgement e-mail includes at least a portion of the file identified by the file name.

11. The method as recited in claim 1, further including:
determining whether the client e-mail includes a valid password; and
wherein when it is determined that the client e-mail does not include a valid password, dropping the client e-mail.

12. The method as recited in claim 1, wherein determining whether the client-e-mail includes an attachment includes determining whether the document control command is a check in command.

13. The method as recited in claim 12, the attachment including at least a portion of a file identified by the associated file name.

14. The method as recited in claim 1, further including:
determining whether the document control command is a check out command;
wherein when it is determined that the document control command is a check out command, appending an attachment to the acknowledgement e-mail including at least a portion of a file identified by the file name associated with the document control command.

15. The method as recited in claim 14, wherein appending includes:
locating the file identified by the file name on the second side of the firewall; and
determining a size of the file to ascertain a number of acknowledgement e-mails to be sent.

16. The method as recited in claim 1, further including:
entering a header in the acknowledgement e-mail, the header including source and destination addresses;
entering a password in the acknowledgement e-mail, the password indicating that the acknowledgement e-mail has been handled by a document control system; and
entering the file name associated with the document control command in the acknowledgement e-mail, wherein the status indicates success or failure of the document control command.

17. The method as recited in claim 16, further including:
entering a confirmation code associated with the document access request in the acknowledgement e-mail.

18. The method as recited in claim 16, further including:
entering in the acknowledgement e-mail a total number of acknowledgement e-mails that are to be received in association with the document access request.

19. The method as recited in claim 1, further including:
deleting information associated with the document access request from memory.

20. A computer-readable medium storing thereon computer-readable instructions for providing access to a document across a firewall having a first side and a second side, the comprising:
instructions for receiving a client e-mail across the firewall from the first side of the firewall, the client e-mail including a document access request specifying a document control command and an associated file name;
instructions for executing the document access request such that a status of the executed document access request is obtained;
instructions for sending an acknowledgement e-mail specifying the status across the firewall to the first side of the firewall;
instructions for parsing the client e-mail to obtain information associated with the document access request;
instructions for determining whether the client e-mail includes an attachment; and instructions for concatenating the attachment to previously retrieved attachments associated with the document access request when it is determined that the client e-mail includes an attachment.

21. An apparatus for providing access to a document across a firewall having a first side and a second side, comprising:
means for receiving a client e-mail across the firewall from the first side of the firewall, the client e-mail including a document access request specifying a document control command and an associated file name;
means for executing the document access request such that a status of the executed document access request is obtained;
means for sending an acknowledgement e-mail specifying the status across the firewall to the first side of the firewall;
means for parsing the client e-mail to obtain information associated with the document access request;
means for determining whether the client e-mail includes an attachment; and
means for concatenating the attachment to previously retrieved attachments associated with the document access request when it is determined that the client e-mail includes an attachment.

22. An apparatus for providing access to a document across a firewall having a first side and a second side, comprising:
a processor; and
a memory, at least one of the processor and the memory being adapted for:
receiving a client e-mail across the firewall from the first side of the firewall, the client e-mail including a document access request specifying a document control command and an associated file name;
executing the document access request such that a status of the executed document access request is obtained;
sending an acknowledgement e-mail specifying the status across the firewall to the first side of the firewall;
parsing the client e-mail to obtain information associated with the document access request;
determining whether the client e-mail includes an attachment; and concatenating the attachment to previously retrieved attachments associated with the document access request when it is determined that the client e-mail in an attachment.

* * * * *

UNITED STATES PATENT AND TRADEMARK OFFICE
CERTIFICATE OF CORRECTION

PATENT NO. : 6,654,892 B1
DATED : November 25, 2003
INVENTOR(S) : Ron Karim

It is certified that error appears in the above-identified patent and that said Letters Patent is hereby corrected as shown below:

Column 14,
Line 59, change "in" to -- includes --

Signed and Sealed this

Thirteenth Day of July, 2004

JON W. DUDAS
*Acting Director of the United States Patent and Trademark Office*